Jan. 13, 1925.　　　　　　　　　　　　　　　　　　　　1,522,683
E. W. HOGAN
SALES INDICATING AND CHECKING APPARATUS
Filed Jan. 26, 1923
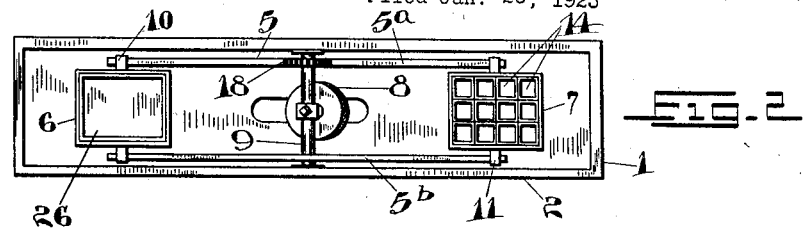
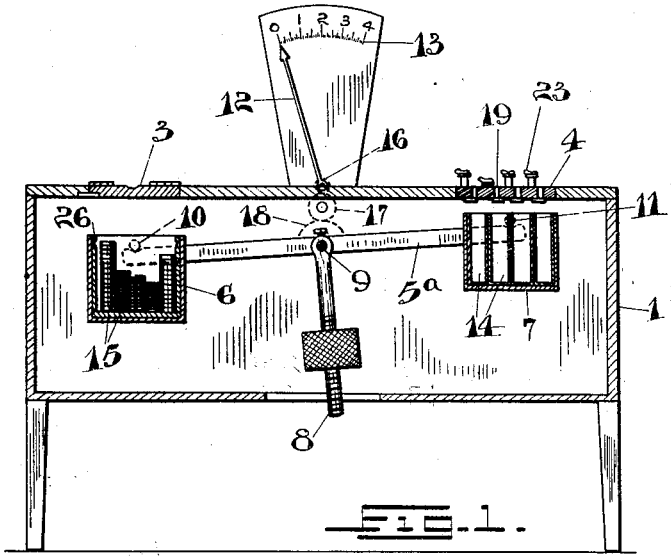
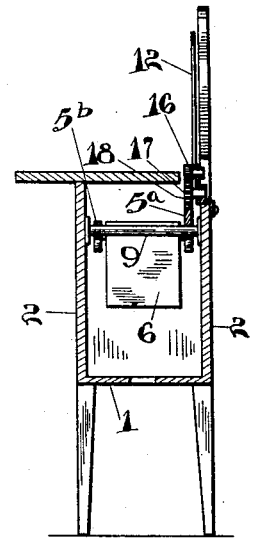
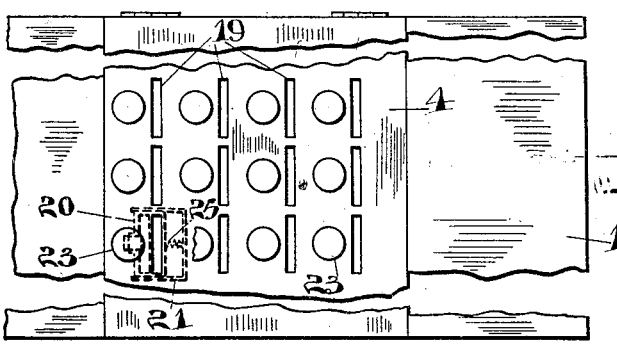
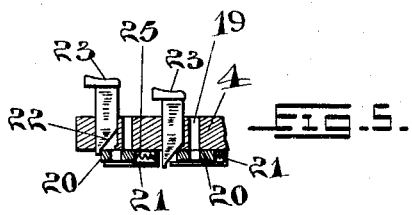
INVENTOR.
E. W. Hogan.
BY J. Edward Maybee.
ATTY.

Patented Jan. 13, 1925.

1,522,683

UNITED STATES PATENT OFFICE.

ENOS W. HOGAN, OF EMO, ONTARIO, CANADA.

SALES INDICATING AND CHECKING APPARATUS.

Application filed January 26, 1923. Serial No. 615,134.

*To all whom it may concern:*

Be it known that I, ENOS W. HOGAN, of Emo, in the district of Rainey River, Province of Ontario, Canada, a subject of the King of Great Britain, have invented certain new and useful Improvements in Sales Indicating and Checking Apparatus, of which the following is a specification.

This invention relates to apparatus for use in stores in which the total sales of each of a number of different departments are to be ascertained and checked, and my object is to provide simple and reliable means for obtaining the above results.

I attain my objects by means of the constructions hereinafter described and illustrated in the accompanying drawings in which—

Fig. 1 is a vertical section of my apparatus;

Fig. 2 a plan view of the same, with the top removed;

Fig. 3 a cross section of the same;

Fig. 4 a detail showing the slotted hinged lid on a larger scale; and

Fig. 5 a sectional detail of part of Fig. 4.

In the drawings like numerals of reference indicate corresponding parts in the different figures.

1 is a frame preferably of cabinet style having the sides 2 and a top provided with hinged lids 3 and 4. A scale beam 5 transversely pivoted intermediate its ends on the frame 1 suitably carries the token pan 6 and the pan 7 at opposite ends of the beam. These pans are formed as open topped boxes. The beam is provided with a weighted pendulum or counterweight 8 to regulate the amount of movement of either end of the beam relative to the opposite end thereof, thus ensuring that the position of the beam will correspond to the differences in the weights carried in the pans. Preferably this beam is formed by two bars $5^a$ and $5^b$ carried on the transverse shaft 9 fulcrumed on the frame 1. The pans 6 and 7 are each provided with a pair of transversely arranged knife edges 10 and 11 respectively adapted for engagement with suitable notches formed adjacent the opposite ends of each bar $5^a$ and $5^b$. An index finger or pointer 12 and a graduated scale 13 are provided to indicate the position of the scale beam.

In the pan 7 are fitted the pockets or receptacles 14 which are each removably carried and each pocket is numbered or lettered to correspond with a department of a general or departmental store so that the sales of each department may be checked up as hereinafter described. In the box shaped pan 6 is carried the token receptacle 26 in which are carried the tokens 15, the weight of each of these tokens representing certain value in currency so that the weight of a token representing a sale of $1.00 would equal the weight of two 50¢ tokens, four 25¢ tokens, ten 10¢ tokens, twenty 5¢ tokens, or one-hundred 1¢ tokens. Referring to Fig. 1, it will be noted that a space for a cash till or cash register (not shown) is provided on the cabinet top in front of the lower end of the index finger 12.

When a sale has been made and the money deposited in the cash till or register the cashier transfers a corresponding amount of tokens from the pan 6 to that particular department's pocket 14 in the pan 7, thus indicating on the graduated scale 13 the total sales to that point. Preferably the index finger 12 is carried by the spindle of a pinion 16 which meshes with an idler gear 17 which meshes with a segmental gear 18 formed on or secured to the bar $5^a$. This gearing is adapted to move the finger in the same direction as the scale beam 5 and to also move the finger a greater distance than the corresponding movement of the scale beam so that a finer reading is obtained. It will also be noted that the transferring of tokens from one pan to the other has the same effect on the scale beam as an arrangement using only one pan with corresponding tokens of twice the weight taken from a fixed container.

The hinged lids 3 and 4 are positioned to lie over the pans 6 and 7 respectively. To obtain the desired tokens from the pan 6 it is necessary to lift the lid 3, but to enable the tokens to be deposited in the desired pockets 14 I provide the lid 4 with a plurality of slots 19. Each of the slots is substantially in alinement with a pocket 14 and each slot is opened and closed by a reciprocating slotted closure 20 slidably mounted in the guide 21. These closures may be operated by means of a cash register department's tabulating keys. Preferably each closure is actuated by means of an inclined surface 22, formed on the lower end of a key 23, adapted to engage the closure to bring its slot into register with the slot 19. Springs 25 engage the closures and tend to hold them in their closed position relative to the slots 19. Any suitable means for limiting the movement of the closures due to the action of the springs 25 may be provided. The corresponding key 23 of each pocket 14 will have the number, letter or name of its department marked on the top thereof and these keys may also be used to open a cash till or register. To enable a token to be deposited in a pocket 14 requires a depression of the corresponding key 23 to open or uncover the slot 19 communicating with that pocket. To prevent unauthorized person tampering with the tokens deposited in the pockets 14 the hinged lid 4 may be locked.

The mode of operation is as follows, assuming all the tokens 15 are in the pan 6 and the empty pockets 14 in their pan 7, the pointer 12 is then at a certain point on the graduated scale 13 which should be "zero" as no sales have been made. As each sale is made the cashier transfers the corresponding amount of tokens from the pan 6 to one of the pockets 14, depending on the department making the sale, and the finger 12 indicates each transfer of a token. Supposing the index finger moves from "zero" to "1" on the graduated scale 13, anyone knowing the value of the sales in currency corresponding with this movement of the index finger, due to the transfer of the tokens, could see the total amount of sales made without counting the tokens in the pockets or the cash in the till or register, but more readily by following out a plan of weighing as follows. At the close of the day's business the total sales are indicated by the finger and also by the quantity of the tokens in all the pockets and the sales of each department are represented by the tokens in its particular pocket. The figures may be ascertained by counting and evaluating the tokens. Supposing the finger indicated sales totalling $100.00 then when the tokens from one of the pockets are transferred back to the token carrying pan 6 and the pocket returned to its pan 7, the finger moves back one-quarter the distance between "1" and "zero" on the scale then it is evident that that particular department had sold $$\frac{\$100.00}{4} = \$25.00$$

worth of goods and its money taken in should equal this amount. The sales of the other departments are checked or ascertained by repeating this process with the remaining pockets.

From the above description it will readily be seen that the apparatus could also be used in a similar manner for checking up purchases. A pocket 14 would then receive tokens to represent the amount of the purchases, of a certain department in a store instead of the sales of the department. The apparatus is also adapted for household use as different pockets 14 could be used to receive tokens to represent the amount of the purchases of different classes of articles.

What I claim is:—

1. Sales indicating and checking apparatus including a scale beam; and tokens adapted to be transferred from one end of the scale beam to the other, the weight of each token representing a certain value in currency whereby the amount of business transacted will be visibly indicated.

2. Sales indicating and checking apparatus including a frame provided with a top having a plurality of slots therein; a scale beam having a pan at one end thereof, the pan being provided with a plurality of pockets, each pocket lying under one of the slots; and tokens adapted to be passed through the slots and received in the said pockets, the weight of each token representing certain value in currency whereby the amount of business transacted will be visibly indicated.

3. Sales indicating and checking apparatus including a frame provided with a top having a plurality of slots therein; a scale beam having a pan at each end thereof, one of the pans being provided with a plurality of pockets, each pocket being removably carried on the pan and lying under one of the slots; and tokens adapted to be transferred from the pan at one end of the beam to the pockets at the other end thereof and vice versa, the weight of each token representing a certain value in currency whereby the amount of business transacted will be visibly indicated.

Signed at Emo, Ont., this 12th day of December 1922.

ENOS W. HOGAN.